United States Patent
Dent et al.

(10) Patent No.: US 7,114,178 B2
(45) Date of Patent: Sep. 26, 2006

(54) SECURITY SYSTEM

(75) Inventors: Paul W. Dent, Pittsboro, NC (US); Janez Skubic, Hässelby (SE)

(73) Assignee: Ericsson Inc., Research Triangle Park, NC (US)

(*) Notice: Subject to any disclaimer, the term of this patent is extended or adjusted under 35 U.S.C. 154(b) by 826 days.

(21) Appl. No.: 09/862,879

(22) Filed: May 22, 2001

(65) Prior Publication Data
US 2002/0178385 A1    Nov. 28, 2002

(51) Int. Cl.
*G06F 17/00* (2006.01)
(52) U.S. Cl. .................. 726/6; 726/4; 726/3
(58) Field of Classification Search ........ 713/200–202, 713/150–152; 709/223–225; 705/50, 80; 726/3, 6, 4
See application file for complete search history.

(56) References Cited

U.S. PATENT DOCUMENTS

| | | | |
|---|---|---|---|
| 5,602,536 A | 2/1997 | Larson et al. | |
| 5,815,557 A | 9/1998 | Larson | |
| 5,897,598 A | 4/1999 | Puetz | |
| 6,038,666 A | 3/2000 | Hsu et al. | |
| 6,175,922 B1 | 1/2001 | Wang | |

FOREIGN PATENT DOCUMENTS

| | | | |
|---|---|---|---|
| EP | 0 870 889 A | 10/1998 | |
| WO | WO 96 01542 A | 1/1996 | |
| WO | WO 98 25000 A | 6/1998 | |

OTHER PUBLICATIONS

A new wireless access system for achieving a cost-effective ubiquitous network; Yoshino et al.; Wireless Personal Multimedia Communications, 2002. The 5th International Symposium on vol. 2, Oct. 27-30, 2002 pp. 606-610 vol. 2.*
Privacy and authentication for wireless local area networks; Aziz, A.; Diffie, W.; Personal Communications, IEEE [see also IEEE Wireless Communications] vol. 1, Issue 1, Ist Qtr. 1994 pp. 25-31.*
The authentication in public WLAN when access controller deployed; Song Yubo; Hu Aiqun; Neural Networks and Signal Processing, 2003. Proceedings of the 2003 International Conference on vol. 2, Dec. 14-17, 2003 pp. 1666-1669 vol. 2.*

* cited by examiner

*Primary Examiner*—David Jung
(74) *Attorney, Agent, or Firm*—Coats & Bennett, P.L.L.C.

(57) ABSTRACT

An access control system includes an access control device, a wireless communication device, and a central controller. The central controller issues authorization codes to the wireless communication device. The wireless communication device is used by an authorized party to enable or activate a protected function secured by an access control device. To enable or activate the protected function, the authorized party uses the wireless communication device to transmit an access request to the access control device, which responds by transmitting an authentication challenge to the wireless communication device. The wireless communication device must transmit a valid authentication response based on the authentication challenge and a valid authorization code stored in its memory. If a valid authentication response is received, the access control device enables or activates the protected function.

77 Claims, 5 Drawing Sheets

SECURITY SYSTEM

BACKGROUND OF THE INVENTION

The present invention relates generally to security systems to provide security for a protected function and, more particularly, to a security system that uses a challenge/response protocol to provide security for the protected functions.

Traditional locks employ a key or combination to limit access to property. Presumably, only persons with right to access the property will possess the key or combination needed to operate the lock. This traditional approach is still widely used. More recently, traditional key and combination locks have been replaced by electronic locking systems actuated by plastic cards with magnetic strips. This type of electronic lock is commonly used in hotels. In this type of system, a door handle and electromechanical locking mechanism are integrated with a magnetic card reader within a strong metal enclosure. The magnetic card reader reads the inserted card, checks for a key code, and actuates the locking mechanism to unlock the door if the correct key code is supplied.

It is also known in the past to use some sort of identification, such as a PIN code, fingerprint, or iris scan, to enable a locking mechanism to unlock a door. One such device is disclosed in U.S. Pat. No. 6,038,666 to Hsu et al. This patent discloses a wireless method of operating a door lock using fingerprint data. The door lock must first be loaded with fingerprint data of an authorized user and the user's public cipher key. A mobile device carried by the authorized user is also loaded with the same fingerprint data and communicates wirelessly with the door lock. The name of the user is transmitted unencrypted to the door lock. The door lock generates a random public/private cipher key pair and sends the public key to the user's device. The user's device doubly encrypts the fingerprint data using the user device's private key and the door lock's public key in unspecified order, and transmits the result to the door. The door decrypts the received fingerprint data and compares it with the stored fingerprint data, unlocking the door if the fingerprint data matches.

BRIEF SUMMARY OF THE INVENTION

The present invention relates to a security system providing security for a protected function such as unlocking a door. According to the present invention, the protected function is controlled by an access control device. Parties authorized to access the protected function use a wireless communication device, such as a mobile radio telephone, to communicate with the access control device. An authorization code valid for a specified time period is stored in the wireless communication device. To access the secured function, the authorized party causes the wireless communication device to transmit an access request to the access control device. The access control device, in response to the access request, transmits an authentication challenge to the wireless communication devices. The communication challenge will typically comprise at least a random number and may include a time indication. The wireless communication device generates an authentication response by combining selected portions of the authentication challenge (e.g., the random number) with the authorization code stored in its memory and transmits the authentication response to the access control device. The access control device compares the received authentication response to an expected authentication response and enables or activates the protected function if the received authentication response matches the expected authentication response.

In one embodiment of the invention, the access control device is connected by a local area network to a central controller, which can supply the access control device with appropriate authorization codes. The central controller can also change authorization codes when needed. In a second embodiment, the access control device is a stand-alone device programmed with a master code. In this embodiment, the access control device uses the stored master code to compute authorization codes for different time periods. The central controller, with a priori knowledge of the master code used by the access control device, can also compute authorization codes for any time period.

The access control system of the present invention may be used, for example, in a hotel to control access to hotel rooms for predetermined time periods. Those skilled in the art will find numerous other uses for the access control system of the present invention.

DETAILED DESCRIPTION OF THE INVENTION

Figure 1:
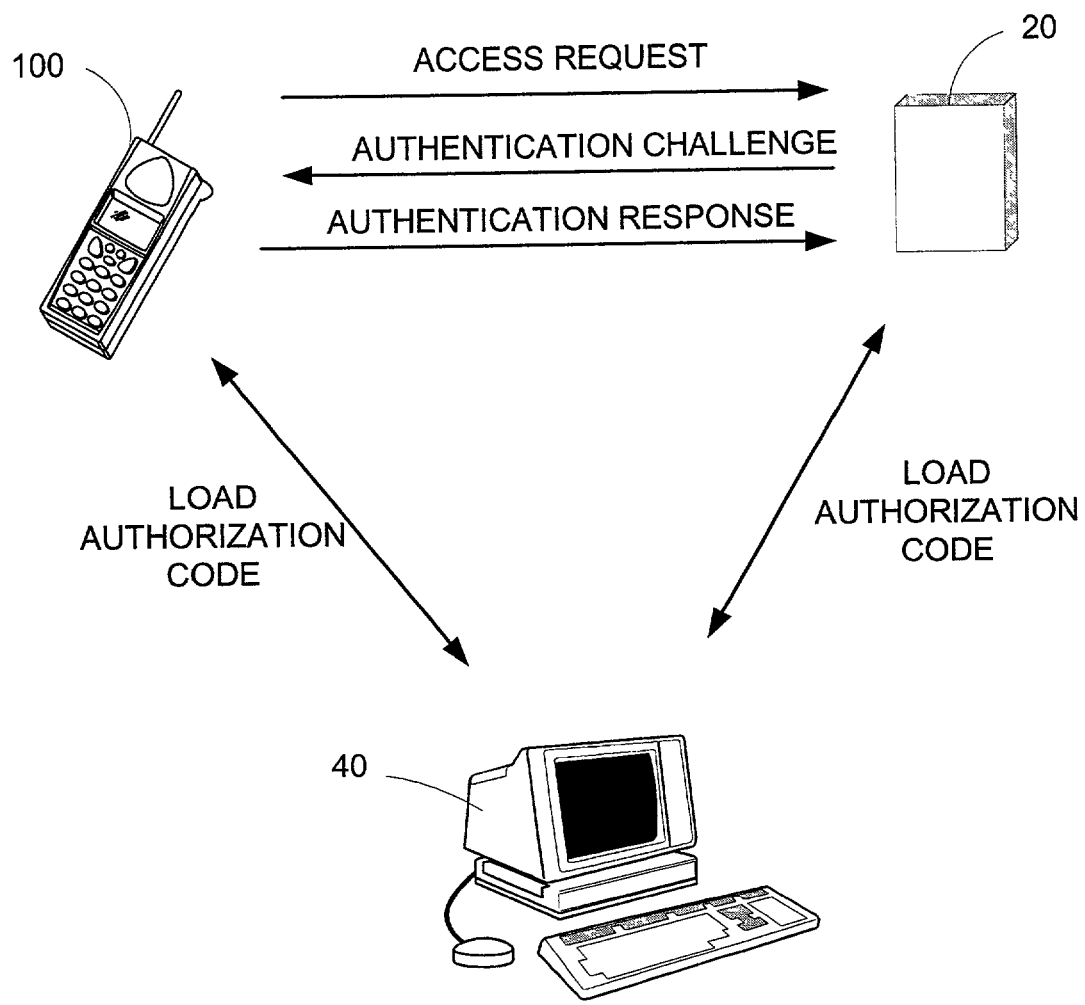
FIG. 1 is a schematic diagram of the wireless door lock system according to the present invention.

FIG. 1 illustrates a security system, indicated generally by the numeral 10, according to the present invention. The security system 10 comprises an access control device 20, a central controller 40, and a wireless communication device 100 for actuating protected functions secured by the access control device 20. In the illustrative embodiment described below, the security system 10 is a wireless door lock system for a hotel and the access control device 20 comprises an electronic door lock. Therefore, for the remainder of the description, the access control device 20 is referred to herein as electronic door lock 20.

According to the present invention, the wireless communication device 100 is enabled with an authorization code by the central controller 40. Once enabled, the wireless communication device 100 may be used to "unlock" the door. To unlock the door, the wireless communication device 100 transmits an access request to the electronic door lock 20 (i.e., access control device). The electronic door lock 20 transmits an authentication challenge to the wireless communication device 100 in response to the access request. The authentication challenge includes, at least, a random bitstring or number which cannot be known in advance to the wireless communication device 100. The wireless communication device 100 combines selected portions of the authentication challenge, including the random bitstring, with the stored authorization code using a predetermined combining algorithm to generate an authentication response and transmits the authentication response to the electronic door lock 20. The electronic door lock 20 computes an expected authentication response using the same combining algorithm. If the received authentication response matches the expected authentication response, the door is unlocked to permit access to the hotel room.

The central controller 40 communicates with the wireless communication device 100 via a wireless interface, such as a BLUETOOTH interface, to supply authorization codes to the wireless communication device 100. Alternatively, the wireless communication device 100 may be inserted into a docking station or connected by means of a cable to a standard interface on central controller 40 to permit the exchange of data. The central controller 40 may also communicate with the electronic door lock 20 to load or change authorization codes for the electronic door lock 20. It is not essential, however, that the central controller 40 communicate with the electronic door lock 20. As will be described below, the electronic door lock 20 can be programmed with a secret master code that is used to compute authorization codes for different time periods. With knowledge of this master code and a device number associated with the electronic door lock 20, the central controller 40 can compute, at any given time, the valid authorization code of the electronic door lock 20.

Communication between the wireless communication device 100 and electronic door lock 20 is by means of a wireless interface, such as a short-range RF interface conforming to the BLUETOOTH standard. The BLUETOOTH standard enables wireless communication of data and voice over short-range wireless links between both mobile devices and fixed devices. The BLUETOOTH interface is a universal radio interface in the 2.45 GHz frequency band that enables portable electronic devices to connect and communicate wirelessly via short-range, ad hoc networks. Persons interested in various details regarding the BLUETOOTH technology are referred to the article entitled "The Bluetooth Radio System" authored by Jaap Haartsen, which can be found in the IEEE Personal Communications, February, 2000, the disclosure of which is incorporated herein by reference. While the present invention is explained herein with reference to the BLUETOOTH standard, it is noted that other standards for short-range wireless interfaces may also be used.

The BLUETOOTH standard makes provision for encryption and decryption of data, allowing data to be communicated securely. Using the BLUETOOTH standard, the wireless communication device 100 can communicate securely with the electronic door lock 20 and central controller 40 without disclosing secret information.

Figure 2:
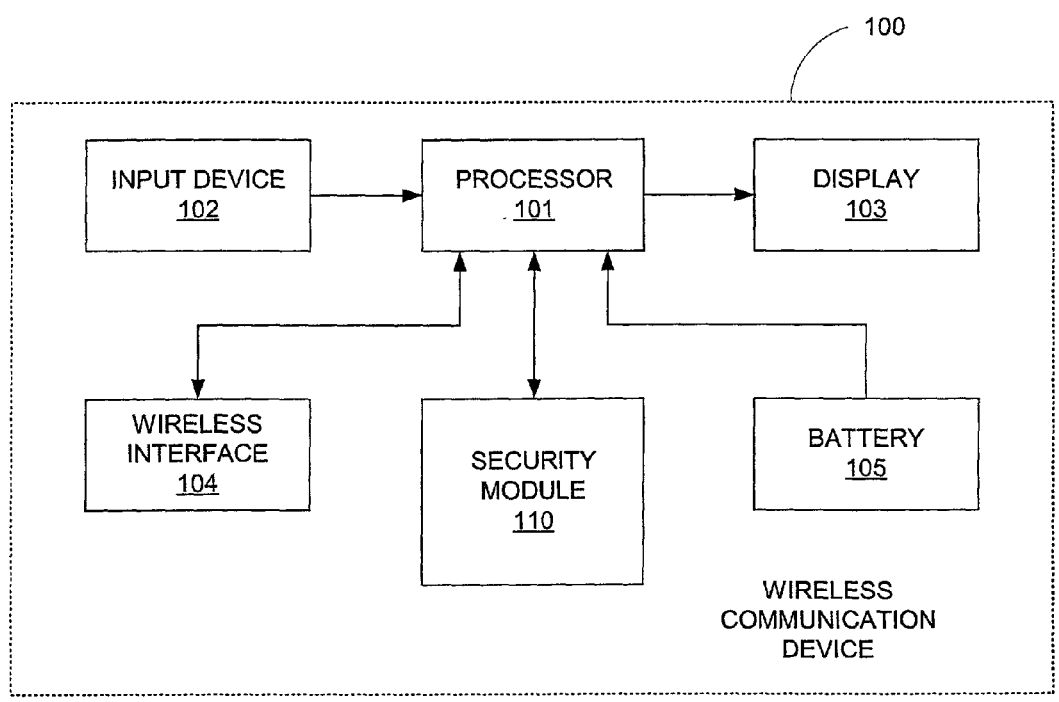
FIG. 2 is a functional block diagram of a wireless communication device used by an authorized party to communicate with an access control device.

FIG. 2 is a functional block diagram showing an exemplary embodiment of a wireless communication device 100 according to the present invention. In the exemplary embodiment, the wireless communication device 100 is a BLUETOOTH-equipped mobile terminal, such as a cellular radiotelephone or personal digital assistant (PDA). The wireless communication device 100 comprises a main processor 101, input device 102, display 103, wireless interface 104, battery 105, and a security module 110. Processor 101 controls the operation of the wireless communication device 100. An input device 102, such as a keypad or pointing device, allows data and commands to be entered by the user. Display 103 enables the user to view information, such as device settings and prompts. Wireless interface 104 enables communication with external devices, such as the electronic door lock 20 and possibly central controller 40. Battery 105 supplies power to the wireless communication device 100. Security module 110 may contain subscription data needed to activate the wireless communication device 100. Additionally, the security module 110 may store security variables, such as public and private encryption keys, to facilitate secure transactions.

Figure 3:
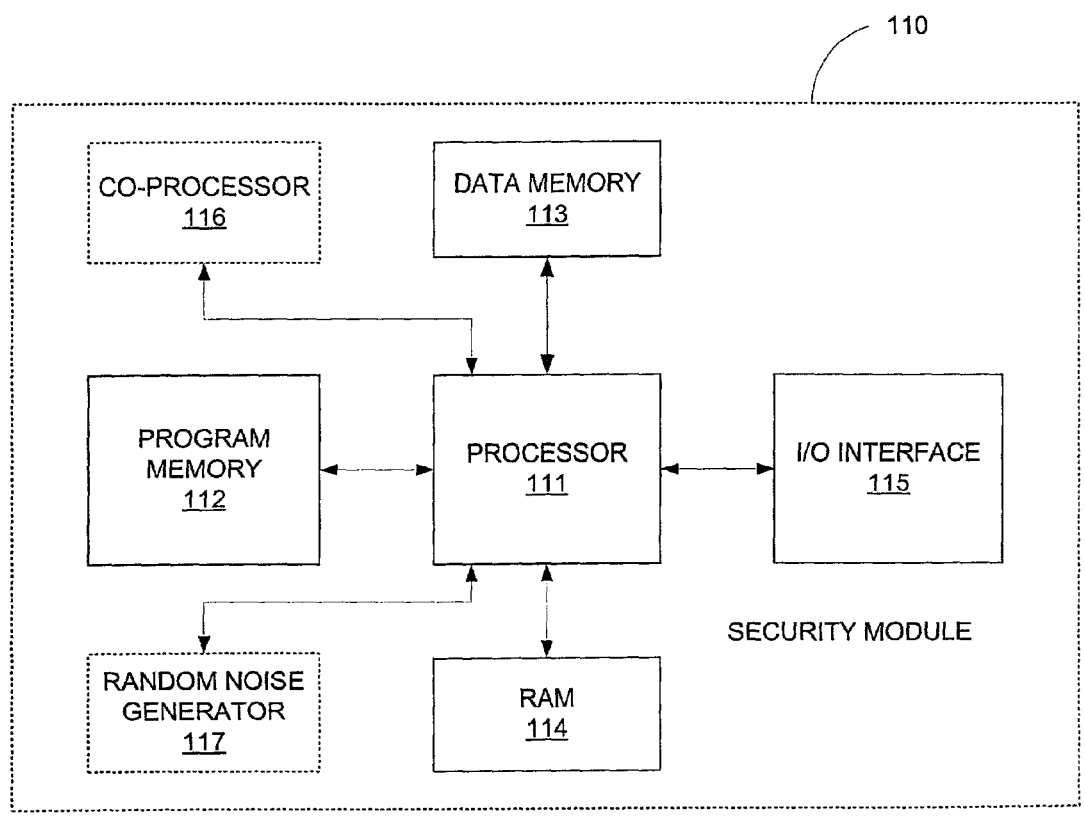
FIG. 3 is a functional block diagram of a security module which may be used in an access control device, wireless communication device, or central controller.

FIG. 3 illustrates the security module 110 in greater detail. Security module 110 comprises a secure processor 111, program memory 112, data memory 1 13, random access memory 114, and I/O interface 115. Security module 110 may optionally include a co-processor 116 and random noise or bit generator 117. Processor 111 executes only selected programs stored in program memory 112. Data memory 113 is used as long-term storage for data generated after manufacture, such as user-specific secret keys. Random access memory 114 is used as temporary storage during calculations. I/O interface 115 interfaces the security module 110 with the main processor 101 in the wireless communication device 100. Co-processor 116, if present, accelerates certain calculations, such as cryptographic calculations involving multiplication, squaring, or exponentiation of long integer values. Random noise generator 117, if present, provides for one-time generation of public/private key pairs and ad hoc authentication challenges, as will be hereinafter described. Co-processor 116 and random noise generator 117 are not necessary to the implementation of the invention, but may be useful for the related aspect of verifying the identity of the user.

Security module 110 may be contained, for example, in a removable smart card. U.S. patent applications related to the use of smart cards include U.S. patent application Ser. No. 09/695,964 filed Oct. 25, 2000 entitled "Method of Bi-Lateral Identity Authentication Over the Internet" and U.S. patent application Ser. No. 09/696,450 entitled "Method for Establishing a Symmetric Cipher Key" filed Oct. 25, 2000, which are incorporated herein by reference. The first-mentioned application describes how to use a wireless communication device 100 containing a smart card to mutually establish the identity of two communicating devices and to establish a temporary session key for efficient, secure communication between the devices. The second application describes a method for securely establishing a secret key and storing the secret key in a smart card. The techniques described in these applications can be used to verify the electronic identity, including the credit identity of a prospective hotel guest and to establish a secret key with which authorization codes are transferred from the central controller 40 to the wireless communication device 100 to be enciphered, thereby preventing interception.

Figure 4:
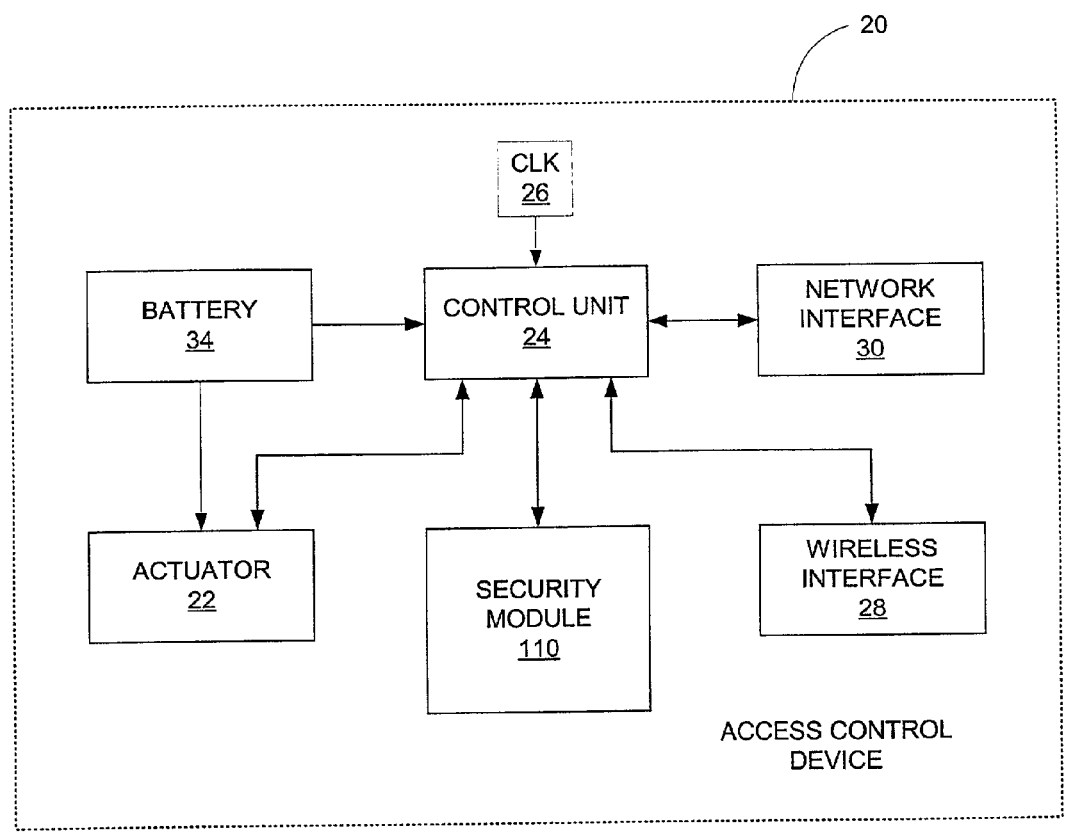
FIG. 4 is a functional block diagram illustrating one exemplary embodiment of an access control device according to the present invention. In this embodiment, the access control device is in the form of an electronic door lock.

FIG. 4 shows an exemplary embodiment of the electronic door lock 20 in more detail. Electronic door lock 20 comprises an actuator 22, control unit 24, internal time clock 26, wireless interface 28, network interface 30, security module 32, and battery 34. Wireless interface 28 allows the electronic door lock 20 to communicate with the wireless communication device 100. As previously mentioned, wireless interface 28 may be a BLUETOOTH interface. Electronic door lock 20 may further include a network interface 30 to connect the electronic door lock 20 to the central controller 40 via a local area network in certain embodiments. Network interface 30 may be a standard interface for wireline communications, such as a serial interface or Ethernet interface, or may be a wireless interface. Alternatively, a single wireless interface 28 may be used for communications with both the wireless communication device 100 and central controller 40. Real time clock 26 provides a time reference to control unit 24. The electronic door lock 20 may further include a security module 110 of the type shown in FIG. 3 that provides secure storage for secret information and performs cryptographic calculations as will be hereinafter described. Power for the electronic door lock 20 is supplied by a battery 34 or other power supply.

Figure 5:
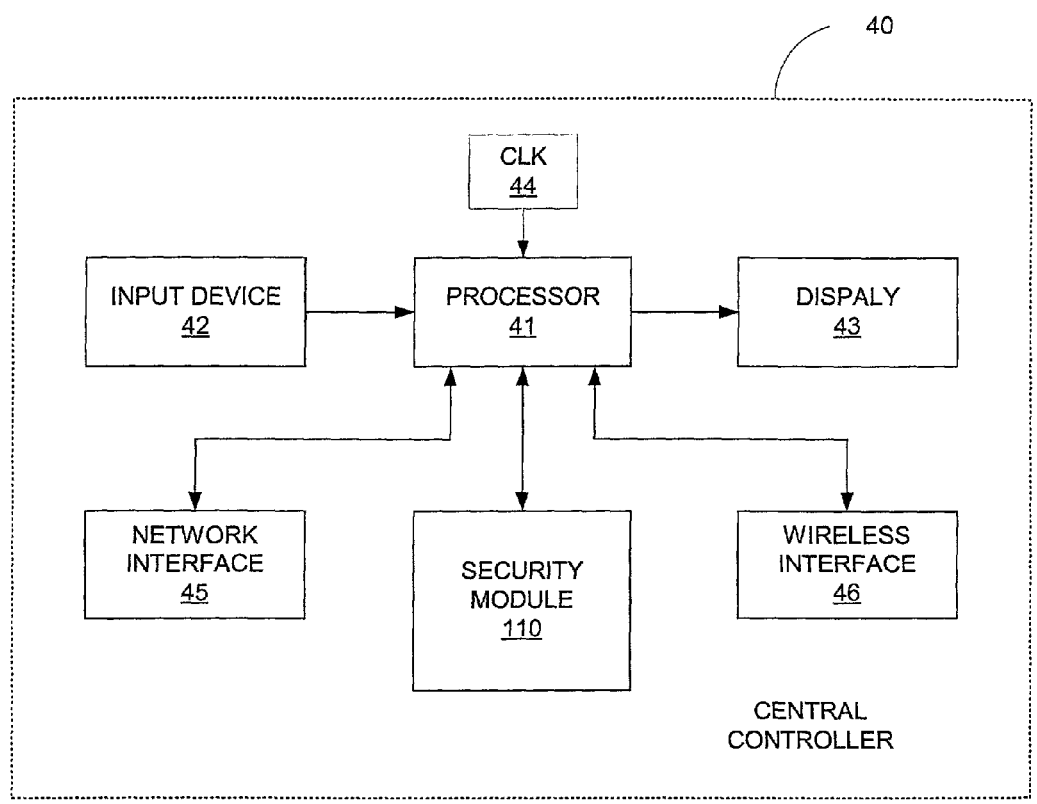
FIG. 5 is a functional block diagram of a central controller used to issue authorization codes to a wireless communication device.

FIG. 5 is a functional block diagram of the central controller 40, which may be located at the hotel check-in desk or connected to a check-in station via a local area network. Central controller 40 typically comprises any type of personal or desktop computer having a processor 41, input device 42, display 43, clock 44, network interface 45, and security module 110. Central controller 40 may further include an interface 46, such as a wireless interface, for communicating with the wireless communication device 100 carried by the customer. Operation can be restricted only to authorized staff by normal log-in procedures using passwords, etc. Operation of security programs can be further protected by the use of reverse passwords originating in the security module 110 as described in U.S. patent application Ser. No. 09/727,062 filed Nov. 30, 2000 entitled "Anti-Spoofing Password Protection," which is incorporated by reference herein. This application describes a method to protect against false displays inviting the user to enter passwords, which would then be conveyed innocently to an unauthorized party.

Security module 110 is typically contained in a secure, tamper-proof package and may be of the type illustrated in FIG. 3. Security module 110 may store secret information used to derive authorization codes as hereinafter described, as well as public and private keys used for encryption and decryption. Network interface 45, such as an Ethernet interface, connects the central controller 40 to a local area network within the hotel, which may provide the means for communicating with the electronic door lock 20. The local area network may further include a gateway (not shown) for communicating with external networks, such as the Internet. Wireless interface 46 may, for example, comprise a BLUETOOTH interface which allows short-range communication and ad hoc networking with other devices. Central controller 40 may communicate with the wireless communication device 100 via wireless interface 46. Alternatively, wireless interface 46 may be replaced by a standard interface, such as a serial interface or USB interface.

According to a first implementation of the invention, electronic door locks 20 of a hotel are supplied with an authorization code by the central controller 40. The authorization code can be supplied to the electronic door lock 20, for example, when the hotel guest checks in. The authorization codes are customized to a particular door or doors and to particular dates or times. Typically, one code is issued for each door for each authorized time period (e.g., day, week). However, the same code may be issued for multiple doors. The central controller 40 may also provide the electronic door lock 20 with a time indication to indicate the period during which the authorization code is valid. The central controller 40 may use an enciphered communication channel based on a secret, symmetric key to communicate with the electronic door lock 20 to secure communications against interception. The cipher key may be a symmetric key known only to the hotel or, alternatively, a public/private key pair may be used for encryption and decryption.

In a second embodiment, no communication is necessary between the electronic door lock 20 and the central controller 40 after installation of the electronic door lock 20. The electronic door lock 20 is programmed with a master code, a device identifier (which may, for example, be the door number), and an initial value for its internal clock 26. Each electronic door lock 20 may generate a new authorization code at a specified check-out time, as determined by its internal clock 26 by combining the master code with its device identifier and the date using a predetermined combining algorithm. The central controller 40 can also generate an authorization code for any door and date by combining the same input variables using the same combining algorithm, which it may then supply to the guest's wireless communication device 100.

In use, a hotel guest bearing a wireless communication device 100 presents himself at the hotel check-in desk. If the wireless communication device 100 includes a BLUETOOTH interface, the wireless communication device 100 may already have established communications with the central controller 40. The details of how communications are established between two BLUETOOTH devices are not material to this invention and are not discussed further herein. Through use of encryption technology, the BLUETOOTH interface provides a secure communication channel between the wireless communication device 100 and central controller 40. During the check-in procedure, the guest may be asked for the electronic equivalent of a credit card for billing purposes. The central controller 40, under the direction of the hotel employee, transmits a credit ID request to the guest's wireless communication device 100. The central controller 40 and wireless communication device 100 may then execute an authentication procedure as described in U.S. patent application Ser. No. 09/696,450. The purpose of the authentication procedure is to establish or authenticate the credit identity of the guest. The authentication procedure may incorporate a key-establishment procedure to establish a session key for further communications. Upon authentication of the claimed credit identity, the central controller 40 transmits authorization code(s) and possibly associated time indications to the wireless communication device 100, which may be enciphered using the agreed-upon session key. Time indications may be needed when multiple authorization codes for different time periods are transferred so that the wireless communication device 100 will know which code to use for any given time period.

The authorization codes and session key are stored in the wireless communication device 100. The authorization codes and session key may, for example, be stored in tamper-proof memory within security module 110 or in protected form in memory 113. One method of protecting an authorization code stored in an insecure memory is to delete selected digits of the authorization code based on a PIN code supplied by the user. The authorization code, in this case, is not operative to unlock the door unless the PIN code, known only to the user, is supplied to fill in the missing digits of the authorization code.

The guest's wireless communication device 100, now programmed with one or more authorization codes and associated time indications, may be used to unlock a hotel door equipped with the electronic door lock 20 of the present invention. The wireless communication device 100 transmits an access request to the electronic door lock 20 to unlock the hotel door. The access request may include a device identifier that addresses the particular electronic door lock 20 (e.g., "358" for room 358). The device identifier may address multiple electronic door locks 20 using a group identifier as will be hereinafter described. Upon receipt of the access request, the electronic door lock 20 generates an authentication challenge in security module 110. Alternatively, the electronic door lock 20 may receive an authentication challenge from the central controller 40 specific to that particular electronic door lock 20 and transmit the authentication challenge to the wireless communication device 100. The authentication challenge transmitted by the electronic door lock 20 may comprise a locally-generated random bitstring or number obtained from a random noise generator 117, which may be located in the electronic door lock 20 or accessible via a local area network. The authentication challenge may further include the current time indication, which can be supplied by either the central controller 40 or by a clock 26 internal to the electronic door lock 20.

Upon receipt of the authentication challenge, the wireless communication device 100 combines at least the random bitstring of the authentication challenge with the appropriate authorization code for the current time period to form an authentication response. The time indication in the authentication challenge (if present) may be used by the wireless communication device 100 to select the appropriate authorization code from a plurality of codes, or the wireless communication device 100 may use a time indication provided by an internal clock (not shown). Wireless communication device 100 transmits the authentication response to the electronic door lock 20.

The electronic door lock 20 compares the received authentication response with an expected authentication response calculated by the electronic door lock 20 or supplied by the central controller 40. If the received authentication response matches the expected authentication response, the electronic door lock 20 actuates the electronic locking mechanism 22 to unlock the door.

The authorization code supplied by the central controller 40 to the wireless communication device 100 may comprise a combination of secret master codes with at least a time indication indicating the time period during which the authorization code is valid. The user of the wireless communication device 100 is, therefore, unable to produce authorization codes for a time period of the user's choosing, since the user does not possess the secret master code. Optionally, the device identifier may be used to generate the authorization code and/or authentication response. The device identifier may be combined by the central controller 40 with the secret master code and time indication to generate the authorization code. Similarly, the device identifier may be combined by the wireless communication device 100 with the authorization code and selected portions of the authentication challenge to generate the authentication response. Using a device identifier to generate the authentication response in wireless communication device 100 may be done when the hotel uses different master codes to produce authorization codes for different doors. If the same master code is used to generate authorization codes for all doors, then the wireless communication device 100 could open any door by substituting a user-supplied device identifier when calculating the authentication response, which is not desired.

A privileged user, such as hotel staff, may receive a wireless communication device 100 programmed with a master authorization code to open any door. A master authorization code is one that opens two or more doors. Such a master authorization code is generated by the central controller 40 using the master code and a group identifier. The master authorization code may also be generated based on a time indication associated with a desired time period. A group identifier is a code that addresses more than one electronic door lock 20. For example, the bitstring for "353" may address electronic door lock for room 353. The bitstring for "35-" (where - represents a blank digit) may be used to address electronic door locks for rooms 350–359. The bitstring for "3--" may be used as a group identifier for all rooms on the third floor, and the bitstring for "---" may be used as a group identifier for all rooms in the hotel.

To use a master authorization code, the wireless communication device 100 transmits a group identifier to the electronic door lock 20 as part of an access request. The access request may be addressed to a specific electronic door lock 20 to prevent other electronic door locks 20 within range of the wireless communication device 100 from actuating. For example, the access request to the electronic door lock 20 for room number 303 could comprise the string 303 3--encoded into bits to indicate to the electronic door lock 20 that the authentication response will be based on a master authorization code for the group comprising all third floor rooms. Likewise, an access request to the electronic door lock 20 for room 358 would include the string 358 3--. The electronic door lock 20 would respond with an authentication challenge and the privileged user's wireless communication device 100 would calculate an authentication response with that user's master authorization code. The master authorization code is computed by the central controller 40, using the group identifier in place of a device identifier. That is, the group identifier is combined with the master code and, possibly, a time indication. The electronic door lock 20 computes an expected authentication response based on the master authorization code for the designated group and compares the authentication response received from the privileged user's wireless communication device 100 with the expected authentication response. Upon a match, the door would be unlocked.

The method described above would unlock any door for rooms beginning with the numeral "3," and, therefore, provides a master key for rooms on the third floor, for example. A universal master key could be computed by hotel security equipment based on the master code, a time indication, and the bit pattern for ---, which references any door. When a door is opened by such master keys, the door lock's internal clock 26 can be reset to a time conveyed from the privileged user's wireless communication device 100 by transmitting a reset command so that any drift or inaccuracy is corrected to the exact hotel time.

The method of combining hotel secret data with time indication, device identifiers, or other variables to produce authorization codes and, likewise, the method of combining authorization codes with selected portions of authentication challenges, either in the wireless communication device 100 or the electronic door lock 20, uses a non-reversible function. The purpose of a non-reversible function is to render impossible or impractical the determination of the master code or authorization code given the output of the function and all other non-secret input variables. Likewise, the non-reversible function renders impractical the generation of authorization codes for another door or time period given the authorization codes for one door or time period, or given the authorization code for many other doors and/or time periods. A good combination algorithm having the desired properties is described in U.S. Pat. No. 5,091,942, which is hereby incorporated by reference. Typically, such a non-reversible function is provided by using a block cipher, using the secret data at the key input, and other data bits as the "data to be encrypted" input. The block cipher, known as DES, may be used, for example, if the security provided by 56-bit secret keys is judged adequate. Otherwise, the iterative block cipher described in the above patent may be extended to any desired key or variable length.

Despite the security provisions described above, sophisticated criminals can attempt to fraudulently gain access to a hotel room by luring an individual with an authorized wireless communication device 100 to request access to the room, relaying the access request to the electronic door lock 20, relaying the authentication challenge from the electronic door lock 20 to the authorized user's wireless communication device 100, and relaying the authentication response received from the authorized user's wireless communication device 100 to the electronic door lock 20. For example, two fraudulent parties may collaborate to lure a hotel guest to remotely unlock his hotel room door so that they can commit theft. One fraudulent party, equipped with a modified wireless communication device, may loiter near a door he wishes to unlock, while the other, having a second similarly-modified wireless communication device 100, engages the unsuspecting guest in a conversation. The second fraudulent party lures or tricks the guest into demonstrating how the wireless communication device 100 is used to unlock a door. Thus, the guest may be lured into transmitting an access request to open the door, which request is received by the second fraudulent party's wireless device and immediately relayed to the first fraudulent party. The first fraudulent party's wireless device retransmits the access request to the electronic door lock 20 at close range and receives in return an authentication challenge, which is relayed to the second fraudulent party. The wireless device of the second fraudulent party retransmits the authentication challenge to the guest's wireless communication device 100. The guest's wireless communication device 100 may respond with the correct authentication response, which is then received by the second fraudulent party's wireless device and relayed to the first party. The wireless device of the first fraudulent party may then retransmit the authentication response to the electronic door lock 20, thereby gaining access to the guest's hotel room. Such fraud may be perpetrated even though the guest may be miles away from the hotel.

There is no way for the guest's wireless communication device 100 to distinguish a relayed authentication challenge from a direct challenge from the electronic door lock 20 based on signal characteristics. The authentication challenge transmitted by the electronic door lock 20 may be reproduced exactly and relayed to the guest's wireless communication device 100 over long distances. Likewise, there is no way for the electronic door lock 20 to distinguish a relayed authentication response from a direct response based on signal characteristics. Thus, a protocol should be implemented to hamper such fraudulent attempts. The following safeguards may be incorporated to hinder fraud with the unwitting aid of an authorized wireless communication device 100.

1. The authorized wireless communication device 100 should not respond to an authentication challenge unless it has first been caused by the user to transmit an access request.

2. The authorized wireless communication device 100 should not automatically respond to an authentication challenge unless the user indicates that it should do so, for example, by pressing a "yes" key in response to a prompt from the wireless communication device 100.

3. The authorized wireless communication device 100 should not transmit an access request until the user has entered a security code, such as a PIN code. Alternatively, during a preamble in the protocol for initially establishing communication with the electronic door lock 20, the user may be requested to enter a security code at a suitable point before continuing.

4. The authorized wireless communication device 100 can display an indication that communication has been established with the electronic door lock 20, which would be a surprise to the user if the user was miles away from the hotel.

5. The electronic door lock 20 can place time delay limits on the receipt of an authentication response after issuing an authentication challenge, short enough to hinder attempts to relay the authentication challenge to a remote authorized device. An authentication response calculation algorithm could be designed so that no partial calculation can usefully commence until receipt of the last bit of the challenge to be transmitted. The authentication response should be calculated as fast as possible and transmitted as soon as possible thereafter, thus allowing the smallest delay limits to be specified and imposed.

6. The BLUETOOTH frequency-hopping communication protocol inherently hinders attempts at fraud by being set up to uniquely, for each link, employ an ad hoc, random frequency sequence. If necessary, the electronic door lock 20 and the authorized wireless communication device 100 can make the authentication response depend in some way on a parameter describing the frequency-hopping sequence. This procedure would require the fraudulent devices to introduce essentially zero delay, which is very difficult when they must operate bi-directionally using time division duplex.

With any or all of the above safeguards, the guest can be protected against unwittingly opening his door from a remote location.

The above invention has been described with respect to a typical application in the hotel business in which temporary guests are awarded access to rooms for a specified period. However, the invention may be used in any circumstances in which a person or device is required to be authorized to perform functions, gain physical access to areas or gain electronic access to information, and the authorization may be controlled by an authorizing party, including limiting the area or time period to which such authorization is granted. Such variations of the invention fall within the scope of the invention as described by the attached claims.

What is claimed is:

1. A method of enabling or activating a protected function, said method comprising:
   storing an authorization code in a wireless communication device;
   transmitting an access request from said wireless communication device to an access control device;
   receiving an authentication challenge from said access control device at said wireless communication device in response to said access request;
   computing an authentication response based on said authentication challenge and said authorization code; and
   transmitting said authentication response from said wireless communication device to said access control device.

2. The method of claim 1 wherein storing an authorization code in said wireless communication device comprises generating an authorization code based on a combination of a secret code and a time indication to limit access to said protected function to a defined time period.

3. The method of claim 1 wherein generating an authorization code based on a combination of a secret code and a time indication further comprises combining a device identifier associated with said access control device with said secret code and said time indication.

4. The method of claim 2 wherein storing an authorization code in said wireless communication device comprises storing a plurality of authorization codes in said wireless communication device, each said authorization code being associated with a different time period.

5. The method of claim 1 wherein storing an authorization code in said wireless communication device comprises storing said authorization code in a smart card associated with said wireless communication device.

6. The method of claim 1 wherein transmitting an access request from said wireless communication device to an access control device comprises transmitting a device identifier associated with said access control device to said access control device.

7. The method of claim 6 wherein transmitting a device identifier associated with said access control device to said access control device comprises transmitting a group identifier derived from said device identifier.

8. The method of claim 1 wherein computing an authentication response based on said authentication challenge and said authorization code comprises combining selected portions of said authentication challenge and said authorization code with a non-reversible function.

9. The method of claim 1 wherein said authentication challenge includes at least a random number and wherein computing an authentication response based on said authentication challenge and said authorization code comprises combining said random number of said authentication challenge and said authorization code.

10. The method of claim 9 wherein computing an authentication response based on said authentication challenge and said authorization code further comprises combining a device identifier associated with said access control device with said random number of said authentication challenge and said authorization code.

11. The method of claim 1 wherein protected function is unlocking a door.

12. The method of claim 1 further comprising transmitting electronic identity from said wireless communication device to a central controller and receiving said authorization code from said central controller following verification of said electronic identity.

13. The method of claim 12 wherein said electronic identity is a credit identity of a user verified by a credit agency.

14. The method of claim 12 wherein transmitting electronic identity from said wireless communication device to a central controller comprises transmitting said electronic identity to said central controller via a wireless communication interface.

15. A method of enabling or activating a protected function, said method comprising:
receiving an access request from a wireless communication device at an access control device;
transmitting an authentication challenge from said access control device to said wireless communication device in response to said access request;
receiving an authentication response based on said authentication challenge and an authorization code;
comparing said received authentication response with an expected authentication response; and
generating a control signal to permit access to said protected function if said received authentication response matches said expected authentication response.

16. The method of claim 15 further comprising storing said authorization code in said access control device.

17. The method of claim 16 wherein storing said authorization code in said access control device comprises storing a plurality of authorization codes in said access control device, each authorization code being valid for a defined time period.

18. The method of claim 15 further comprising computing said authorization code based on a combination of a secret code and a time indication.

19. The method of claim 18 wherein computing said authorization code based on a combination of a secret code and a time indication is performed by said access control device.

20. The method of claim 18 wherein computing said authorization code based on a combination of a secret code and a time indication is performed by a central controller in communication with said access control device.

21. The method of claim 18 wherein computing said authorization code based on a combination of a secret code and a time indication further comprises combining a device identifier associated with said access control device with said secret code and said time indication.

22. The method of claim 15 wherein said access request includes a device identifier to address said access control device, and wherein said method further comprises reading said device identifier and transmitting said authentication challenge only if a correct device identifier is received by said access control device.

23. The method of claim 15 further comprising computing said authentication challenge.

24. The method of claim 23 wherein computing said authentication challenge is performed by said access control device.

25. The method of claim 23 wherein computing said authentication challenge is performed by a central controller in communication with said access control device.

26. The method of claim 23 wherein computing said authentication challenge comprises generating a random number.

27. The method of claim 26 wherein computing said authentication challenge comprises combining said random number with a time indication.

28. The method of claim 15 further comprising computing said expected authentication response.

29. The method of claim 28 wherein computing said expected authentication response is performed by said access control device.

30. The method of claim 28 wherein computing said expected authentication response is performed by a central controller in communication with said access control device.

31. The method of claim 28 wherein computing said expected authentication response comprises combining selected portions of said authentication challenge and said authorization code.

32. The method of claim 31 wherein computing said expected authentication response further comprises combining a device identifier associated with said access control device with said selected portion of said authentication challenge and said authorization code.

33. The method of claim 31 wherein said authentication challenge includes at least a random number and where combining selected portions of said authentication challenge and said authorization code comprises combining said random number with said authorization code.

34. The method of claim 31 wherein combining selected portions of said authentication challenge and said authorization code comprises combining said selected portions of said authentication challenge and said authorization code using a non-reversible function.

35. The method of claim 15 wherein said protected function is unlocking a door.

36. A method of programming a wireless communication device with an authorization code used to enable or activate a protected function, said method comprising:
storing a master code in a central controller;
receiving an initialization request from said wireless communication device;
computing an authorization code based on said master code at said central controller in response to receipt of said initialization request;
communicating said authorization code to said wireless communication device.

37. The method of claim 36 further comprising storing said authorization code in said wireless communication device.

38. The method of claim 36 wherein storing a master code in a central controller comprises storing said master code in a tamper-resistant security module.

39. The method of claim 36 wherein said initialization request includes an electronic identity of the requesting party and wherein said method further comprises authenticating the electronic identity of the requesting party.

40. A device for enabling or activating a protected function, said device comprising:
memory to store an authorization code;
a wireless transmitter to transmit an access request and an authentication response to an access control device;
a wireless receiver to receive an authentication challenge from said access control device responsive to said access request;
a processor to compute said authentication response based on said authentication challenge received from said access control device and said authorization code.

41. The device of claim 40 wherein said authorization code is based on a master code.

42. The device of claim 41 wherein said authorization code comprises a combination of said master code and a time indication to limit access to said protected function to a defined time period.

43. The device of claim 42 wherein said memory stores a plurality of authorization codes for a plurality of defined time periods.

44. The device of claim 41 wherein said authorization code comprises a combination of said master code with identification code associated with said protected function.

45. The device of claim 44 wherein said identification code uniquely identifies said protected function.

46. The device of claim 45 wherein said identification code comprises a plurality of symbols and wherein a subset of said symbols identifies a group of access control devices.

47. The device of claim 40 wherein said protected function is the ability to unlock a door and wherein said authorization code unlocks said door.

48. The device of claim 40 wherein said wireless transmitter is a short-range wireless transmitter.

49. The device of claim 48 wherein said wireless receiver is a short-range wireless receiver.

50. The device of claim 49 wherein said wireless transmitter and said wireless receiver comprise a BLUETOOTH transmitter and BLUETOOTH receiver respectively.

51. The device of claim 40 further comprising a cellular radiotelephone transceiver for communicating with a mobile communication network.

52. The device of claim 40 further comprising a tamper-resistant security module containing said processor.

53. The device of claim 52 wherein said tamper resistant security module comprises a smart card.

54. The device of claim 40 wherein said processor combines selected portions of said authentication challenge with said authorization code to generate said authentication response.

55. The device of claim 54 wherein said processor further combines said selected portions of said authentication challenge and said authorization code with an identification code associated with said protected function to generate said authentication response.

56. The device of claim 54 wherein said selected portions of said authentication challenge includes at least a random number contained in said authentication challenge.

57. The device of claim 40 wherein said device exchanges messages with a central controller according to a predetermined protocol to obtain said authorization code.

58. The device of claim 57 wherein said device transmits its identity to said central controller as part of said predetermined protocol to enable its identity to be authenticated by said central controller.

59. The device of claim 58 wherein said identity is the credit identity of a user verified by a credit agency.

60. An access control device to secure a protected function, said access control device comprising:
a wireless transceiver to communicate with a wireless communication device;
a processor programmed to:
generate an authentication challenge in response to an access request from said wireless communication device;
transmit said authentication response via said wireless transceiver to said wireless communication device;
receive an authentication response from said wireless communication device via said wireless transceiver;
compare said received authentication response to an expected authentication response based on said authentication challenge and an authorization code; and
generate a control signal to permit access to said protected function if said expected authentication response matches said received authentication response.

61. The access control device of claim 60 further comprising memory to store a master code, said processor being further programmed to compute said authorization code based on said master code.

62. The access control device of claim 61 wherein said processor computes said authorization code by combining said master code with a time indication associated with a time period during which said authorization code is valid.

63. The access control device of claim 62 wherein said processor computes said authorization code by further combining a device identifier with said master code and said time indication.

64. The access control device of claim 62 further comprising a tamper resistant security module containing said memory.

65. The access control device of claim 60 wherein said authentication challenge comprises a random bit pattern.

66. The access control device of claim 64 further comprising a random bit generator to generate said random bit pattern.

67. The access control device of claim 65 wherein said authentication challenge generated by said processor further comprises a time indication.

68. The access control device of claim 60 further comprising an actuator responsive to said control signal to unlock a door.

69. The access control device of claim 60 wherein said access control device is identified by a device identifier and wherein said processor is programmed to respond to access requests containing at least a portion of said device identifier.

70. The access control device of claim 60 further comprising a clock to provide a time indication to said processor to use to validate an authentication response.

71. The access control device of claim 70 wherein said processor is responsive to a reset command to reset said clock to a time indicated in said reset command.

72. A device for issuing authorization code to activate or enable a protected function, said device comprising:
 memory to store a master code;
 an interface to communicate with a wireless communication device;
 a processor programmed to:
  compute an authorization code based on said master code in response to receipt of an initialization request from said wireless communication device;
  transmit said authorization code to said wireless communication device.

73. The device of claim 72 further comprising a tamper resistant security module containing said memory to hinder extraction of said master code from said memory.

74. The device of claim 72 wherein said interface is a wireless interface.

75. The device of claim 74 wherein said interface is a wireless BLUETOOTH interface.

76. The device of claim 75 wherein said processor is programmed to execute an authentication procedure in response to receipt of said initialization request.

77. The device of claim 76 wherein said processor authenticates a claimed electronic identity received from said wireless communication device as part of said authentication procedure.

* * * * *